(12) United States Patent
Boutros et al.

(10) Patent No.: US 11,405,352 B2
(45) Date of Patent: *Aug. 2, 2022

(54) FAST RELEARNING OF WORKLOAD MAC ADDRESSES MULTI-HOMED TO ACTIVE AND BACKUP GATEWAYS

(71) Applicant: Nicira, Inc., Palo Alto, CA (US)

(72) Inventors: Sami Boutros, Union City, CA (US); Jerome Catrouillet, Santa Clara, CA (US); Ankur Kumar Sharma, Mountain View, CA (US)

(73) Assignee: Nicira, Inc., Palo Alto, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/847,866

(22) Filed: Apr. 14, 2020

(65) Prior Publication Data
US 2020/0244618 A1 Jul. 30, 2020

Related U.S. Application Data

(63) Continuation of application No. 15/891,105, filed on Feb. 7, 2018, now Pat. No. 10,637,821.

(60) Provisional application No. 62/579,039, filed on Oct. 30, 2017.

(51) Int. Cl.
*H04L 61/106* (2022.01)
*H04L 12/66* (2006.01)
*H04L 12/46* (2006.01)
*H04L 101/622* (2022.01)

(52) U.S. Cl.
CPC ........ *H04L 61/106* (2013.01); *H04L 12/4633* (2013.01); *H04L 12/4641* (2013.01); *H04L 12/66* (2013.01); *H04L 61/6022* (2013.01)

(58) Field of Classification Search
None
See application file for complete search history.

(56) References Cited

U.S. PATENT DOCUMENTS

| | | |
|---|---|---|
| 2010/0220620 A1 | 9/2010 | Timm et al. |
| 2015/0063364 A1 | 3/2015 | Thakkar et al. |
| 2017/0041209 A1 | 2/2017 | Joshi et al. |
| 2018/0034722 A1 | 2/2018 | Gupta |
| 2019/0028577 A1* | 1/2019 | D?Souza ................. H04L 45/22 |
| 2019/0110214 A1 | 4/2019 | Shen et al. |
| 2019/0215190 A1* | 7/2019 | Gao ......................... H04L 45/22 |

* cited by examiner

Primary Examiner — Saumit Shah

(57) ABSTRACT

The technology disclosed herein enables remote gateways to quickly re-learn MAC addresses of workloads for a gateway that has taken over for another gateway. In a particular embodiment, a method provides determining that a backup gateway should begin handling communications exchanged with one or more workloads of an active gateway for a logical network. The method further provides transferring a control message to one or more remote gateways in communication with the backup gateway. The control message instructs the remote gateways to change MAC addresses learned from, and associated with, the active gateway to being associated with the backup gateway. The method also provides, in the backup gateway, receiving network communications directed to one or more of the workloads from one or more of the remote gateways.

20 Claims, 7 Drawing Sheets

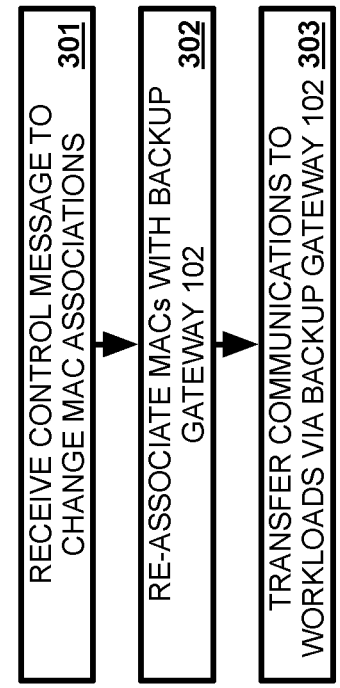
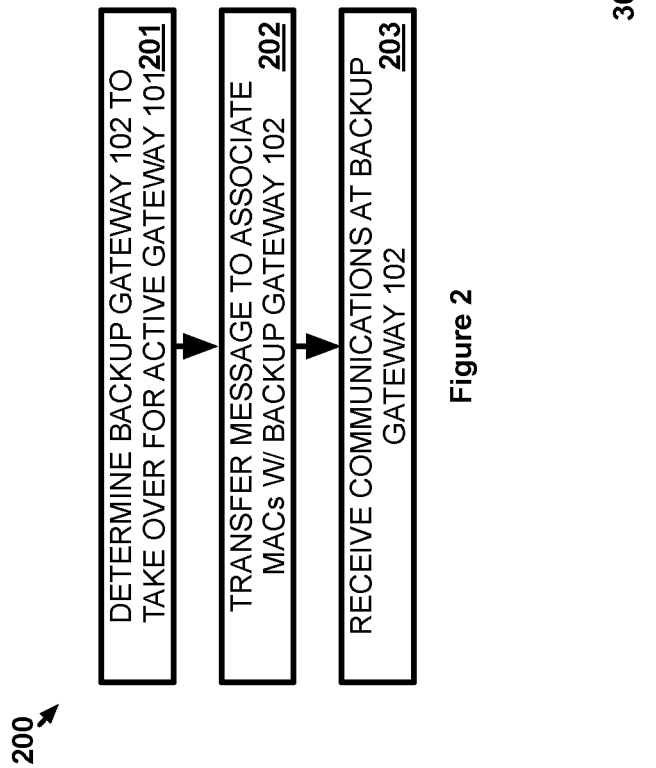

FAST RELEARNING OF WORKLOAD MAC ADDRESSES MULTI-HOMED TO ACTIVE AND BACKUP GATEWAYS

RELATED APPLICATIONS

This application is a continuation of, and claims priority to, U.S. patent application Ser. No. 15/891,105, entitled "FAST RELEARNING OF WORKLOAD MAC ADDRESSES MULTI-HOMED TO ACTIVE AND BACKUP GATEWAYS," filed on Feb. 7, 2018, which itself claims priority to U.S. Provisional Patent Application 62/579,039, titled "FAST RELEARNING OF WORKLOAD MAC ADDRESSES MULTI-HOMED TO ACTIVE AND BACKUP GATEWAYS," filed Oct. 30, 2017, both of which are hereby incorporated by reference in their entirety.

TECHNICAL BACKGROUND

In a logical overlay network, each gateway provides connectivity to its local workloads for them to communicate with other remote workloads connected to remote gateways. This connectivity includes both L2 and L3 traffic. Through the data plane of the logical network, a gateway typically learns the media access control (MAC) addresses for all workloads connected to it via L2 switches and may also learn the IP/MAC bindings associated with those workloads. Furthermore, a gateway will learn the remote workload MAC addresses connected via remote gateways. To provide redundancy, a workload may be multi-homed to more than one gateway. One gateway acts as an active gateway while another gateway backs up that active gateway in a standby capacity. Network, traffic from a workload will flow through the active gateway as long as the active gateway remains active. However, when the active gateway fails, or is otherwise unable to continue handling traffic, the traffic will flow via the backup gateway.

An issue with data plane MAC address learning in the active/backup relationship described above is that remote gateways need to relearn the MACs addresses via the newly activated backup gateway. That relearning process will rely on MAC address relearning due to bi-directional traffic or, as a last resort, aging out of MAC addresses in the absence of frames from the sources. The process can, therefore, lead to a larger convergence time for the MAC addresses to be relearned as being associated with the backup gateway. Even if the MAC addresses can be re-learned via a central control plane, rather than the data plane, the time it takes the control plane to learn about the switchover to the newly active gateway, or to re-teach the remote gateways about the MAC addresses' new association with the backup gateway can still lead to higher convergence time.

SUMMARY

The technology disclosed herein enables remote gateways to quickly re-learn MAC addresses of workloads for a gateway that has taken over for another gateway. In a particular embodiment, a method provides determining that a backup gateway should begin handling communications exchanged with one or more workloads of an active gateway for a logical network. The method further provides transferring a control message to one or more remote gateways in communication with the backup gateway. The control message instructs the remote gateways to change MAC addresses learned from, and associated with, the active gateway to being associated with the backup gateway. The method also provides, in the backup gateway, receiving network communications directed to one or more of the workloads from one or more of the remote gateways.

In some embodiments, responsive to receiving the control message, each of the remote gateways iterates through a MAC address table to change a destination gateway field for each MAC address learned from the active gateway to instead identify the backup gateway.

In some embodiments, the active gateway comprises a first Virtual Tunnel Endpoint (VTEP) and the backup gateway comprises a second VTEP. In these embodiments, the control message may indicate an identifier for the first VTEP, an identifier for the second VTEP, and an identifier for the logical network.

In some embodiments, the control message comprises a control packet having an Operations, Administration and Maintenance (OAM) bit set. Also, in some embodiments, the logical network comprises a nvo3 (Network Virtualization Overlays) type logical network and, in these embodiments, the logical network may be implemented using Geneve or Virtual Extensible Local Area Networking (VXLAN).

In another embodiment, an apparatus is provided to implement a backup gateway. The apparatus having one or more computer readable storage media and a processing system operatively coupled with the one or more computer readable storage media. Program instructions stored on the one or more computer readable storage media, when read and executed by the processing system, direct the processing system to determine that a backup gateway should begin handling communications exchanged with one or more workloads of an active gateway for a logical network. The program instructions further direct the processing system to transfer a control message to one or more remote gateways in communication with the backup gateway. The control message instructs the remote gateways to change MAC addresses learned from, and associated with, the active gateway to being associated with the backup gateway. The program instructions also direct the processing system to receive network communications directed to one or more of the workloads from one or more of the remote gateways.

In yet another embodiment, a method provides, in a remote gateway, receiving a control message, from a backup gateway, that instructs the remote gateway to change MAC addresses learned from, and associated with, an active gateway to being associated with the backup gateway. The backup gateway transfers the control message in response to determining that the backup gateway should begin handling communications exchanged with one or more workloads of the active gateway for a logical network. The method further provides associating, with the backup gateway, the MAC addresses learned from the active gateway and transferring network communications to one or more of the workloads via the backup gateway.

BRIEF DESCRIPTION OF THE DRAWINGS

FIG. 2 illustrates a scenario for the implementation to fast relearn MAC addresses multi-homed to active and backup gateways.

FIG. 3 illustrates another scenario for the implementation to fast relearn MAC addresses multi-homed to active and backup gateways.

DETAILED DESCRIPTION

Fast relearning of MAC addresses is achieved herein by the newly active backup gateway transferring a control message to remote gateways instructing the remote gateways to associate MAC addresses learned from the previously active gateway to now be associated with the backup gateway. Effectively, within the remote gateways, after complying with the instruction from the control message, MAC addresses learned from the previously active gateway will now appear as though they were learned from the backup gateway. Any traffic directed to one of those MAC addresses will therefore be directed to the backup gateway accordingly.

Figure 1:
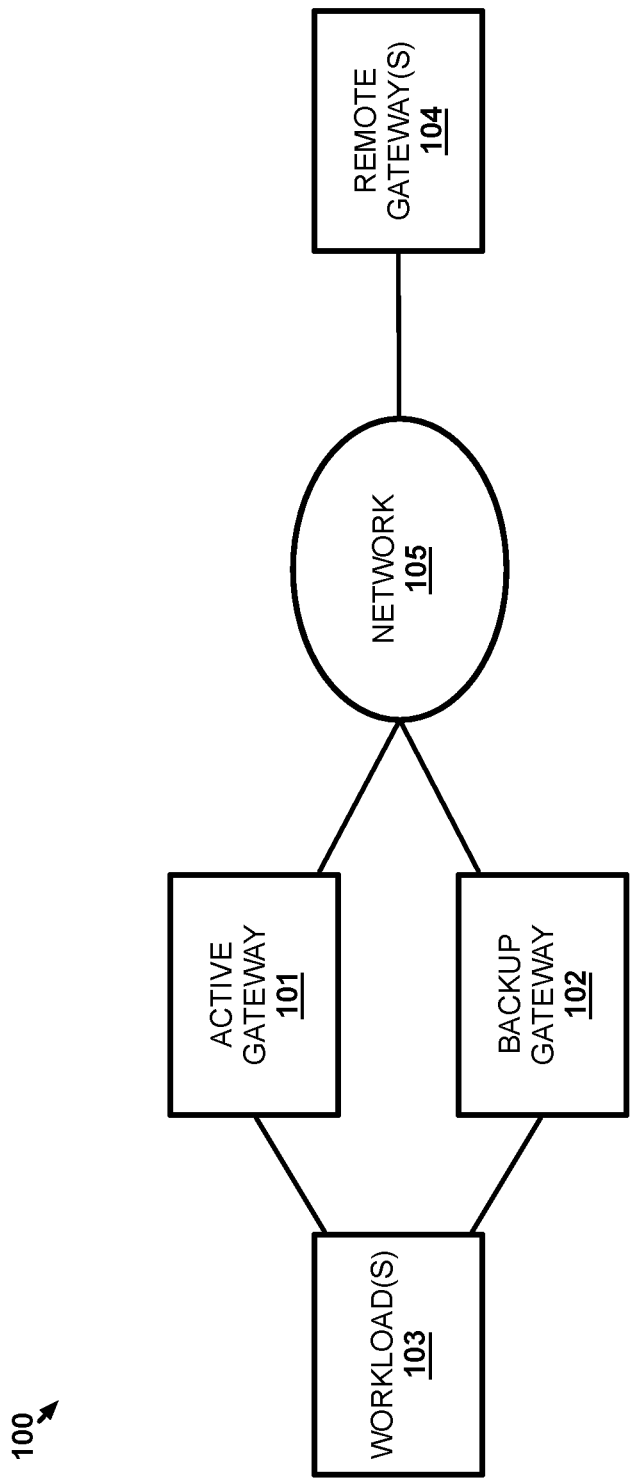
FIG. 1 illustrates an implementation for fast relearning of MAC addresses multi-homed to active and backup gateways.

FIG. 1 illustrates implementation 100 for fast relearning of MAC addresses multi-homed to active and backup gateways. Implementation 100 includes active gateway 101, backup gateway 102, one or more workloads 103, one or more remote gateways 104, and communication network 105. Active gateway 101, backup gateway 102 (when activated), remote gateways 104, and communication network 105 implement a logical communication network between workloads 103 and one or more workloads serviced by remote gateways 104. Communication network 105 may also provide connectivity to the Internet, or other communication networks, for workloads 103. Communication network 105 is a logical network implemented on physical computing and networking resources (e.g., routers, switches, wired/wireless communication links, servers, etc.) to provide logical communication links between workloads 103 and other workloads connected thereto. Similarly, active gateway 101, backup gateway 102, workloads 103, and remote gateways 104 may be processes executing on physical computing hardware (e.g., processing circuitry, network communication circuitry, memory circuitry, etc.) either directly or virtualized, as a virtual machine, container, or otherwise, though host software, such as a hypervisor, executing on the hardware. Active gateway 101, backup gateway 102, and remote gateways 104 may be endpoints, such as virtual tunnel endpoints (VTEPs), using tunneling protocols, such as Geneve, Virtual Extensible Local Area Networking (VXLAN), or other type of tunnel encapsulation used for encapsulating multi-tenant Layer 2 frames, or may be some other type of logical network gateway.

In operation, remote gateways 104 learn the MAC addresses of workloads 103, and note that the MAC addresses are associated with active gateway 101, during the normal course of exchanging communications with workloads 103. For instance, communications received at one of remote gateways 104 from one of workloads 103 indicates the MAC address of the workload as the origination address for the communications and, since the communications were received from active gateway 101, the remote gateway knows that the MAC address is associated with active gateway 101. Then, when the remote gateway receives communications from one of its own workloads directed to the learned MAC address of the workload from above, the remote gateway knows to direct those communications through active gateway 101. Backup gateway 102 operates in a standby capacity until such moment when active gateway 101 fails, or is otherwise unable to perform its duties. At that point, backup gateway 102 is made active to handle communications exchanged with workloads 103. Remote gateways 104 will not know that the MAC addresses learned from active gateway 101 should now be associated with backup gateway 102. The faster that remote gateways 104 can relearn that MAC addresses of workloads 103 are now homed to backup gateway 102 instead of active gateway 101, the less time communications exchanged with workloads 103 may be disrupted.

FIG. 2 illustrates scenario 200 for implementation 100 to fast relearn MAC addresses multi-homed to active and backup gateways. In scenario 200, backup gateway 102 determines that backup gateway 102 should begin handling communications exchanged with workloads 103 that were previously being handled by active gateway 101 (201). A control plane may instruct backup gateway 102 to takeover, backup gateway 102 may make the determination on its own (e.g., through heartbeat type messages exchanged with active gateway 101), or in some other manner.

Upon taking over duties of handling communications exchanged with workloads 103, backup gateway 102 transfers a control message to remote gateways 104 (202). A separate control message may be sent to each respective one of remote gateways 104 or a single control message may be multi-casted or broadcasted to remote gateways 104. In some examples, an operations, administration, and management (OAM) bit may be set in the packet carrying the control message to ensure the packet is not dropped by the physical communication network underlying communication network 105. The control message instructs the remote gateways to change all MAC addresses learned from, and thereby associated with, active gateway 101 to being associated with backup gateway 102 as though the MAC addresses were learned from backup gateway 102 in the first place. For example, upon each of remote gateways 104 receiving the control message, the respective remote gateways 104 each iterate through a table therein that stores MAC addresses and their associated gateway. Upon reaching a MAC address entry indicating that the MAC address is associated with active gateway 101, the entry is changed so that the MAC address is instead associated with backup gateway 102. Gateways in the table may be identified by their own MAC address, a VTEP IP address, or in some other manner—including combinations thereof.

In alternative examples, rather than instructing remote gateways 104 to move the MAC addresses learned from active gateway 101 to being associated with backup gateway 102, the control message may instruct remote gateways 104 to flush the MAC addresses associated with active gateway 101. Remote gateways 104 would then relearn the MAC addresses of workloads 103 from backup gateway 102 in the same manner the addresses were originally learned from active gateway 101.

Once the MAC addresses for workloads 103 are changed to be associated with backup gateway 102 in remote gateways 104, remote gateways 104 can start directing communications to workloads 103 via backup gateway 102. Example, one of remote gateways 104 receives communications directed to one of workloads 103 as identified by the workload's MAC address. The remote gateway determines that the workload's MAC address is associated with backup gateway 102 and transfers the communications to backup gateway 102. Backup gateway 102 receives the network communications directed to one or more of workloads 103 from one or more of remote gateways 104 and passes the network communications to the appropriate workload of workloads 103 (203).

FIG. 3 illustrates scenario 300 for implementation 100 to fast relearn MAC addresses multi-homed to active and backup gateways. In particular, scenario 300 is an example of scenario 200 from the perspective of remote gateways 104. In scenario 300, each of remote gateways 104 receives the control message from backup gateway 102 that instructs backup gateway 102 to change the MAC addresses associated with active gateway 101 to being associated with backup gateway 102 (301). Responsive to receiving the control message, each of remote gateways 104 complies with the control message by indicating that the MAC addresses for workloads 103, which were previously learned from and associated with active gateway 101, are now associated with backup gateway 102 (302). Remote gateways 104 may each include a table or other type of data structure that maintains the associations. Thus, the information within the data structure that indicates the gateway/MAC address associations would be changed. Once the gateway associations have been changed in remote gateways 104, when each of remote gateways 104 receives network traffic directed to one of workloads 103, the remote gateway knows to transfer the traffic to backup gateway 102 and does so accordingly (303).

Advantageously, in scenarios 200 and 300, remote gateways 104 are able to re-learn that the MAC addresses of workloads 103 are associated with backup gateway 102 more quickly than remote gateways 104 otherwise would have.

Figure 4:
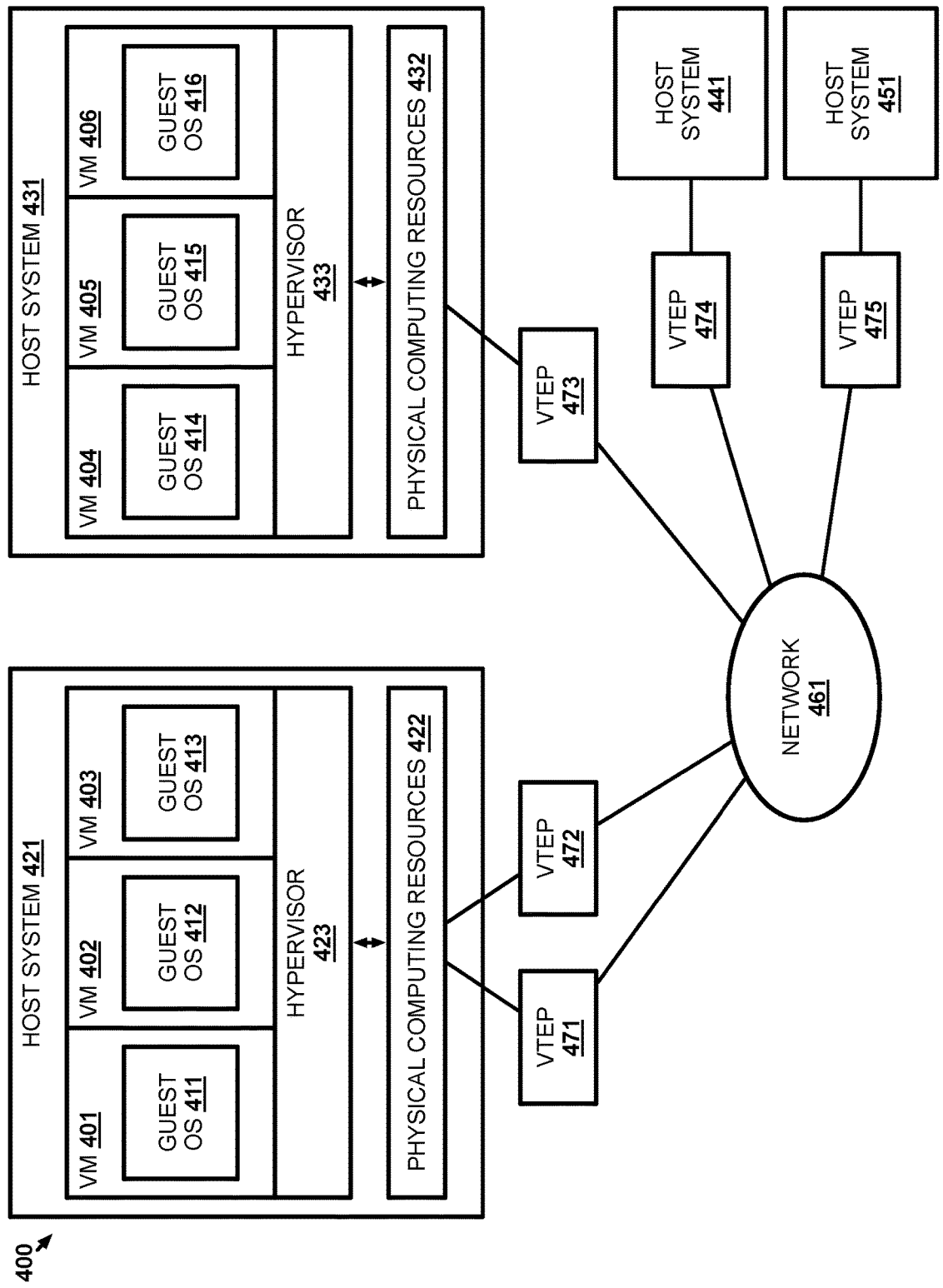
FIG. 4 illustrates another implementation for fast relearning of MAC addresses multi-homed to active and backup gateways.

FIG. 4 illustrates implementation 400 for fast relearning of MAC addresses multi-homed to active and backup gateways. In this example, the gateways are VTEPs that implement an nvo3 network over the physical network components. Implementation 400 includes host computing system 421, host computing system 431, host computing system 441, host computing system 451, VTEP 471, VTEP 472, VTEP 473, VTEP 474, VTEP 475, and physical network 561. Physical network 461 may include the Internet, one or more local area networks, one or more wide area networks, and/or one or more other types of networks between computing systems. VTEPs 471-475 may each be implemented as a dedicated network element, such as a router or a switch, having their own network interface circuitry and processing circuitry or may be implemented on some other type of network node, including a host computing system having similar structure to host computing system 421 and host computing system 431. U.S. Pat. No. 9,602,305 describes one example in which a VTEP may be implemented external to a host computing system having workloads thereon (e.g., host computing system 421) and is hereby incorporated by reference in its entirety. Moreover, VTEP 471 and VTEP 472, or any active/backup VTEP pair, should be implemented on different physical elements such that failure of one physical element does not affect the ability of the other to support the VTEP thereon.

In this example, host computing system 421 executes hypervisor 423, as hosts, to allocate physical computing resources 422 among virtual machines 401-403. Likewise, host computing system 431 executes hypervisor 433 to allocate physical computing resources 432 among virtual machines 404-406. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Each of virtual machines 401-406 have a respective guest operating system (OS) 411-416 executing as the workload thereon. While not shown, one or more applications may be running on each of guest OSs 411-416 to perform various tasks, such as an application tier of a hosted application.

Host computing system 441 and host computing system 451 may both have similar structure to host computing system 421 and host computing system 431. As such, host computing system 441 and/or host computing system 451 may similarly host one or more virtual machines via respective hypervisors. Alternatively, workloads of host computing system 441 and/or host computing system 451 may execute directly on their respective host computing system rather than being virtualized thereon.

It should be understood that the distribution of virtual machines evenly across two host computing systems, as shown in FIG. 4, is merely exemplary. The six virtual machines shown may instead be implemented on any number of host computing systems. Likewise, host computing systems 421 and 431 could host additional hosts (e.g., hypervisors) and virtual machines and/or other virtual elements that are not involved in this example.

Figure 5:
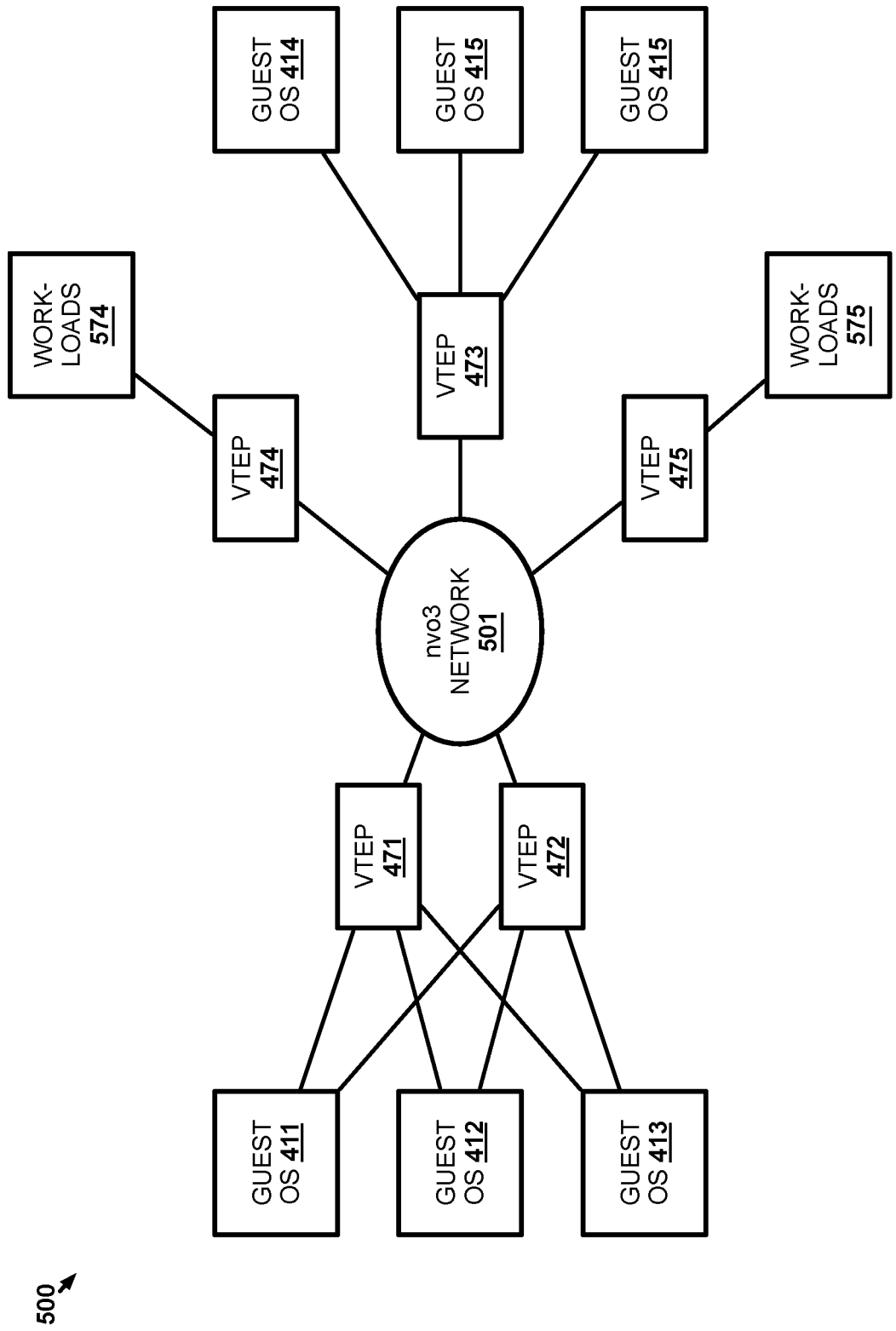
FIG. 5 illustrates a logical arrangement of the other implementation for fast relearning of MAC addresses multi-homed to active and backup gateways.

FIG. 5 illustrates logical arrangement 500 of implementation 400 for fast relearning of MAC addresses multi-homed to active and backup gateways. Logical arrangement 500 shows how VTEPs 471-475 implement an nvo3 network 501 on physical network 461. VTEPs 471-475 may use a tunneling protocol, such as Geneve or VXLAN, between each other to facilitate nvo3 network 501 over physical network 461. The workloads of host computing system 421 (i.e., guest OSs 411-413), the workloads of host computing system 431 (i.e., guest OSs 414-416), workloads 574 of host computing system 441, and workloads 575 over host computing system 451 communicate over nvo3 network 501. In this example, VTEP 471 is the active VTEP for communications exchanged with guest OSs 411-413 and VTEP 472 stands by as a backup. The other workloads of logical arrangement 500 are shown to be only associated with a single active VTEP 473-475. However, VTEPs 473-475 may each also have a backup VTEP that acts in a similar capacity to VTEP 472, as described below.

Figure 6:
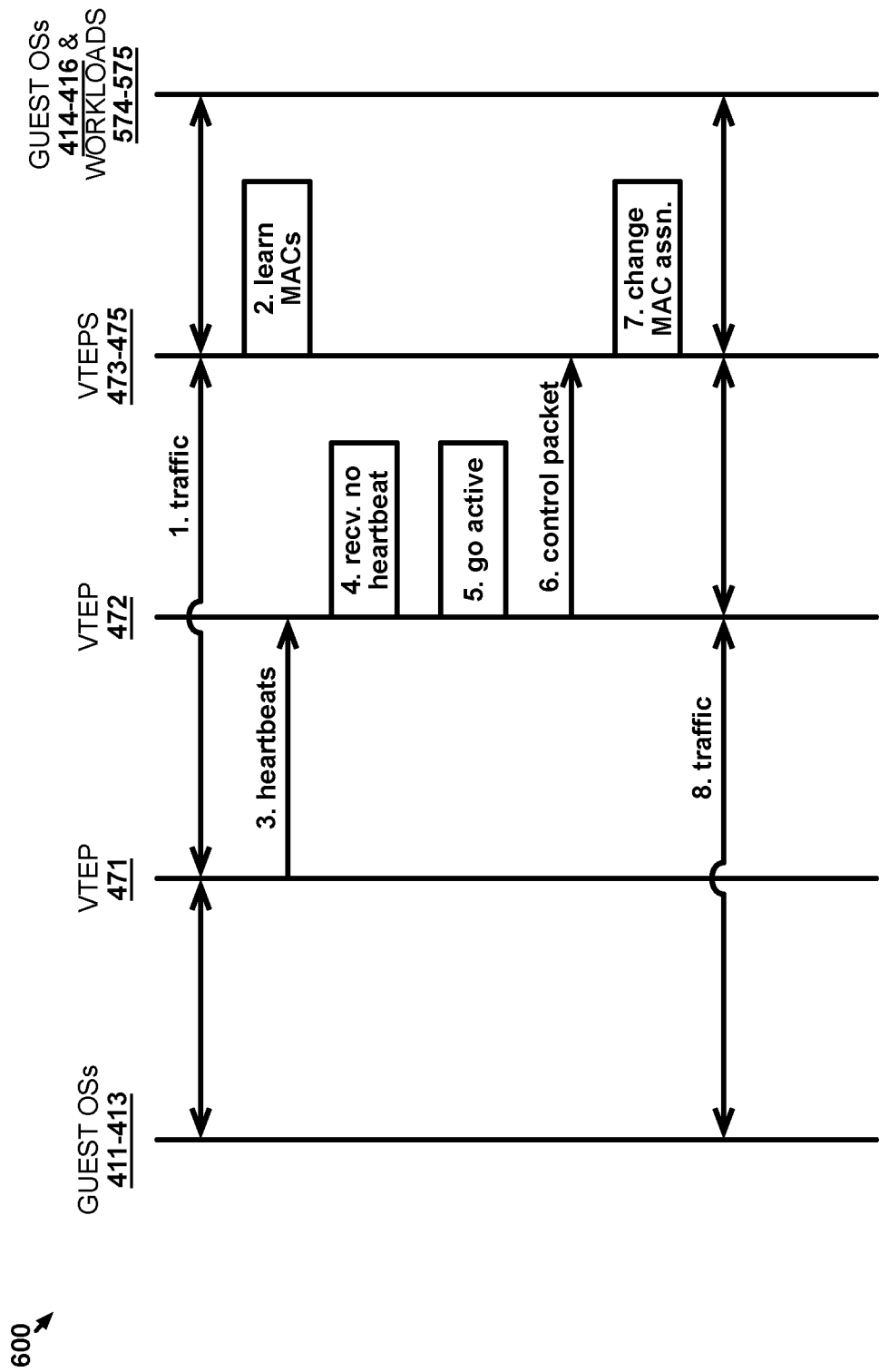
FIG. 6 illustrates a scenario for the other implementation to fast relearn MAC addresses multi-homed to active and backup gateways.

FIG. 6 illustrates scenario 600 for implementation 400 to fast relearn MAC addresses multi-homed to active and backup gateways. Scenario 600 begins with VTEP 471 operating as the active VTEP for workloads on host computing system 421. As such, communication traffic is exchanged at step 1 between any of guest OSs 411-413 and any of guest OSs 414-416 and workloads 574-575. From that traffic, at step 2, each of VTEPs 473-475 learns the MAC addresses of each of guest OSs 411-413 insofar as traffic from each of guest OSs 411-413 passes through a particular one of VTEPs 473-475. For example, if VTEP 473 receives network traffic transferred from guest OS 412 via VTEP 471, VTEP 473 would associate the MAC address of guest OS 412 with VTEP 471. Then, if one of guest OSs 414-416 transfers network traffic back to guest OS 412, VTEP 471 would recognize that the MAC address of guest OS 412 in the network traffic and know to transfer that traffic to VTEP 471. As workloads come and go, as may be the case when new virtual machines are instantiated or taken down on host computing system 421, VTEPs 473-475 would continue to learn and update their MAC address associations.

During the normal exchange of network traffic, as described above, VTEP 472 periodically receives heartbeat messages from VTEP 471 at step 3 to indicate that VTEP 471 is still operating properly and that VTEP 472 can remain on standby. The heartbeat messages may be transferred on an out of band link between VTEP 471 and VTEP 472. In this example, VTEP 472 fails to receive a heartbeat message at step 4, which VTEP 472 assumes indicates that VTEP 471 is no longer operational. In some cases, VTEP 472 may attempt to contact VTEP 471 to ensure VTEP 471 is non-functional before taking any action. Once VTEP 472 has determined that VTEP 471 has gone down and VTEP 472 should takeover as the active VTEP for guest OSs 411-413, VTEP 472 activates itself for handling the network traffic exchanged with guest OSs 411-413 at step 5. The activation may include notifying guest OSs 411-413 that VTEP 472 has activated or guest OSs 411-413 may simply start sending traffic to VTEP 472 upon recognizing themselves that VTEP 471 is down. Upon going active, VTEP 472 sends a control packet to each of VTEPs 473-475 notifying them that VTEP 472 is now the active VTEP for guest OSs 411-413 by instructing VTEPs 473-475 to change the VTEP association of the MAC addresses for guest OSs 411-413 to VTEP 472 rather than VTEP 471.

Figure 7:
FIG. 7 illustrates an exemplary control packet in the scenario to fast relearn MAC addresses multi-homed to active and backup gateways.

FIG. 7 illustrates an exemplary control packet 700 in scenario 600 to fast relearn MAC addresses multi-homed to active and backup gateways. Control packet 700 is an example of the control packet sent at step 6 of scenario 600 to each of VTEPs 473-475. Control packet 700 carries identifier 711 for VTEP 471, identifier 712 for VTEP 472, and identifier 713 for nvo3 network 501. identifier 711 for VTEP 471 and identifier 712 for VTEP 472 may each comprise a unique 20-bit label identifier, an IP address, or some other type of identifier. Identifier 713 for nvo3 network 501 is included because VTEPs 472-475 may handle other nvo3 networks. Identifier 713 for nvo3 network 501 may comprise a 24-bit VXLAN network identifier (VNI) when nvo3 network 501 uses VXLAN encapsulation or may use a different type of identifier when a different type of encapsulation is used. Though not shown, control packet 700 may further carry an explicit instruction for identifier 711 for VTEP 471 to be replaced with identifier 712 for VTEP 472 for all MAC addresses currently associated with VTEP 471. Alternatively, the instruction may be implicit in the receipt of control packet 700. Moreover, control packet 700 may have an OAM bit in its header set, as defined by the encapsulation protocol (e.g., Geneve, VXLAN, etc.), to ensure that control packet 700 does not get dropped in transit between VTEP 471 and each of VTEPs 473-475.

Referring back to scenario 600, the upon each of VTEPs 473-475 receiving the control packet, each of VTEPs 473-475 changes MAC addresses currently associated with VTEP 471 to be associated with VTEP 472 instead at step 7. Each of VTEPs 473-475 may maintain a local data structure that includes workload MAC addresses and indicates the VTEP associated with each respective MAC address. One example of such a data structure is a table listing the MAC addresses and their corresponding VTEPs, as described below.

Figure 8:
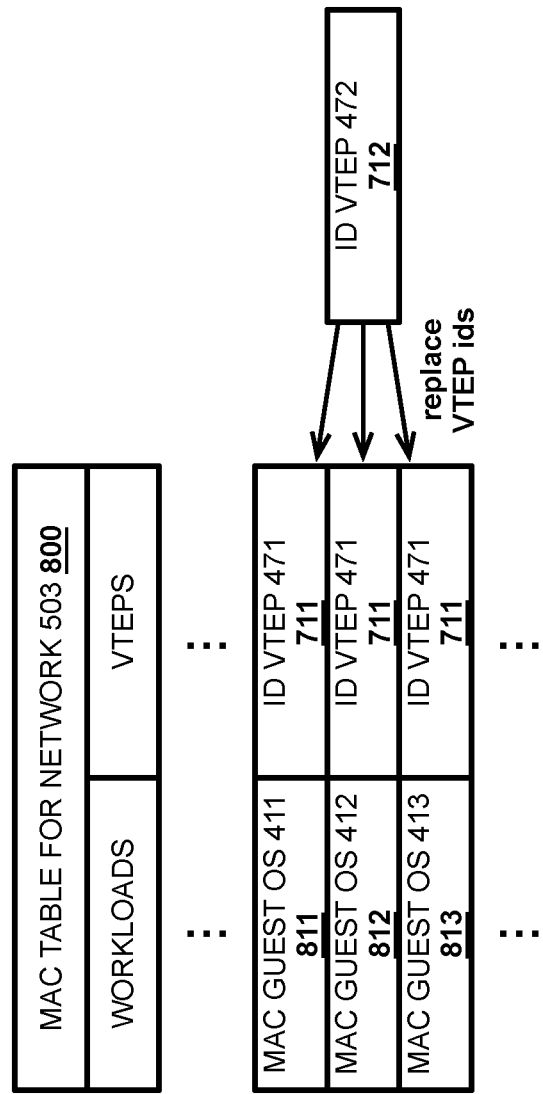
FIG. 8 illustrates an exemplary MAC address table in the scenario to fast relearn MAC addresses multi-homed to active and backup gateways.

FIG. 8 illustrates an exemplary MAC address table 800 in scenario 600 to fast relearn MAC addresses multi-homed to active and backup gateways. MAC address table 800 in their example is the MAC address table used by VTEP 473, although VTEPS 474 and 475 may have tables with similar entries. MAC address table 800 includes a column for workloads, each represented by the workload's MAC address, and a column for VTEPs, each represented by an identifier for the VTEP. A workload MAC address shares a row with its corresponding VTEP identifier. MAC address table 800 likely includes entries beyond those illustrated. For example, MAC address table 800 may have entries for workloads 574 and workloads 575 indicating that VTEP 474 and VTEP 475, respectively, are the corresponding VTEPs.

When VTEP 473 performs step 7 from scenario 600 on MAC address table 800, VTEP 473 iterates through the rows of MAC address table 800 to find all entries of identifier 711 for VTEP 471. In this case, there are three such entries, one corresponding to each of MAC address 811 for Guest OS 411, MAC address 812 for Guest OS 412, and MAC address 813 for Guest OS 413. For each of the three entries, identifier 711 for VTEP 471 is replaced with identifier 712 for VTEP 472. After replacement, MAC address table 800 shows that MAC address 811 for Guest OS 411, MAC address 812 for Guest OS 412, and MAC address 813 for Guest OS 413 are all associated with identifier 712 for VTEP 472 just as it would if the MAC addresses were originally learned via VTEP 472. The MAC address tables of VTEP 474 and VTEP 475 would be changed similarly.

Again referring back to scenario 600, once the MAC address/VTEP associations have been changed, network traffic continues to be exchanged at step 8. However, any traffic directed to guest OSs 411-413, via their respective MAC addresses, will now be routed through VTEP 472 rather than VTEP 471 due to VTEP 472 now being associated with the MAC addresses of guest OSs 411-413 in VTEPs 473-475.

Figure 9:
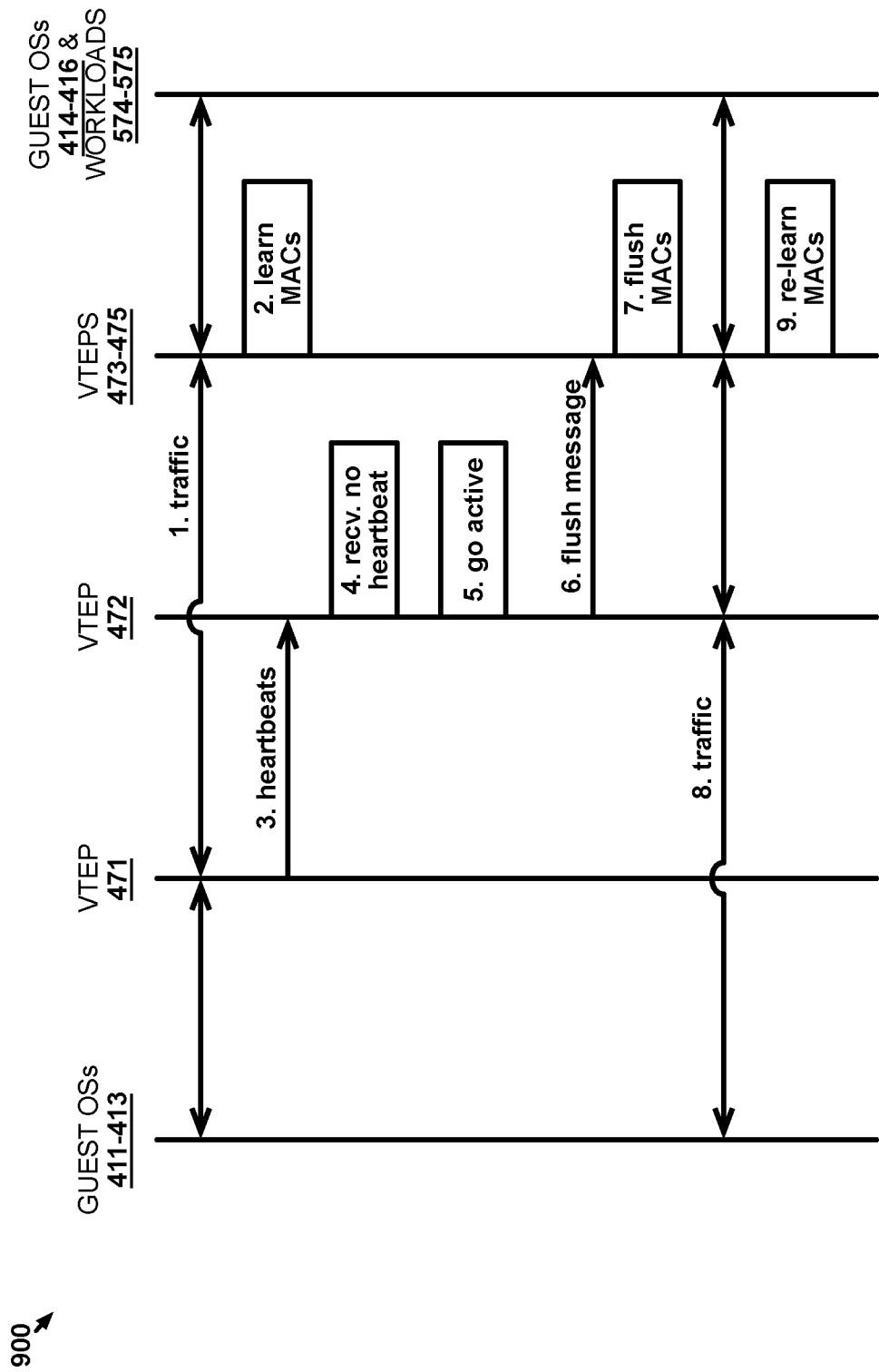
FIG. 9 illustrates another scenario for the other implementation to fast relearn MAC addresses multi-homed to active and backup gateways.

FIG. 9 illustrates scenario 900 for implementation 400 to fast relearn MAC addresses multi-homed to active and backup gateways. Scenario 900 begins with steps 1-5 being similar to those of scenario 600 where VTEPs 473-475 learns the MAC addresses of guest OSs 411-413 and associates those MAC addresses with VTEP 471. Once VTEP 472 goes active at step 5, the control message sent at step 6 to VTEPs 473-475 instructs VTEPs 473-475 to flush MAC addresses associated with VTEP 471. As such, the message would identify VTEP 471 therein (e.g., using identifier 711 for VTEP 471) so that VTEPs 473-475 can identify MAC addresses associated therewith. Upon receiving the control message from VTEP 472, each of VTEPs 473-475 flushes the MAC addresses associated with VTEP 471 (i.e., the MAC addresses of guest OSs 411-413 in this example). VTEPs 473-475 then rely on network traffic continuing to be exchanged at step 8 to re-learn the VTEP associated with the MAC addresses of guest OSs 411-413. Essentially, steps 8 and 9 mirror steps 1 and 2 with respect to traffic from guest OSs 411-413 only the result of the learning associates the MAC addresses of guest OSs 411-413 with VTEP 472 instead of with VTEP 471. In other examples, the control message may instruct VTEPs 473-475 to flush all MAC address/VTEP associations and re-learn VTEPs for all workloads, not just for guest OSs 411-413.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of fast re-learning workload media access control (MAC) addresses, the method comprising:
    determining that a backup gateway should begin handling communications exchanged with one or more workloads of an active gateway for a logical network;
    transferring a control message to one or more remote gateways in communication with the backup gateway, wherein, prior to receiving the control message, the one or more remote gateways associates first MAC addresses of the workloads with the active gateway, and wherein the control message instructs the remote gateways to flush the first MAC addresses; and
    exchanging network communications between the workloads and the remote gateways through the backup gateway, wherein the remote gateways associate the first MAC addresses with the backup gateway in response to the network communications.

2. The method of claim 1, wherein the remote gateways associate the first MAC addresses with the backup gateway by creating an entry in a MAC address table for each MAC address of the first MAC addresses, wherein each entry includes a destination gateway field that indicates the backup gateway.

3. The method of claim 1, wherein the active gateway comprises a first Virtual Tunnel Endpoint (VTEP) and the backup gateway comprises a second VTEP.

4. The method of claim 3, wherein the control message indicates an identifier for the logical network.

5. The method of claim 1, wherein the control message comprises a control packet having an Operations, Administration and Maintenance (OAM) bit set.

6. The method of claim 1, wherein the logical network comprises a nvo3 (Network Virtualization Overlays) type logical network.

7. The method of claim 6, wherein the logical network is implemented using Geneve or Virtual Extensible Local Area Networking (VXLAN).

8. An apparatus implementing a backup gateway for fast re-learning workload media access control (MAC) addresses, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
        determine that a backup gateway should begin handling communications exchanged with one or more workloads of an active gateway for a logical network;
        transfer a control message to one or more remote gateways in communication with the backup gateway, wherein, prior to receiving the control message, the one or more remote gateways associates first MAC addresses of the workloads with the active gateway, and wherein the control message instructs the remote gateways to flush the first MAC addresses; and
        exchange network communications between the workloads and the remote gateways through the backup gateway, wherein the remote gateways associate the first MAC addresses with the backup gateway in response to the network communications.

9. The apparatus of claim 8, wherein the remote gateways associate the first MAC addresses with the backup gateway by creating an entry in a MAC address table for each MAC address of the first MAC addresses, wherein each entry includes a destination gateway field that indicates the backup gateway.

10. The apparatus of claim 8, wherein the active gateway comprises a first Virtual Tunnel Endpoint (VTEP) and the backup gateway comprises a second VTEP.

11. The apparatus of claim 10, wherein the control message indicates an identifier for the logical network.

12. The apparatus of claim 8, wherein the control message comprises a control packet having an Operations, Administration and Maintenance (OAM) bit set.

13. The apparatus of claim 8, wherein the logical network comprises a nvo3 (Network Virtualization Overlays) type logical network.

14. The apparatus of claim 13, wherein the logical network is implemented using Geneve or Virtual Extensible Local Area Networking (VXLAN).

15. A method of fast re-learning workload media access control (MAC) addresses, the method comprising:
    in a remote gateway, receiving a control message, from a backup gateway, that instructs the remote gateways to flush first MAC addresses associated with an active gateway, wherein the backup gateway transfers the control message in response to determining that the backup gateway should begin handling communications exchanged with one or more workloads of the active gateway for a logical network;
    exchanging network communications between the remote gateway and the workloads through the backup gateway; and
    associating the first MAC addresses with the backup gateway in response to the network communications.

16. The method of claim 15, wherein associating the first MAC addresses with the backup gateway comprises:
    creating an entry in a MAC address table for each MAC address of the first MAC addresses, wherein each entry includes a destination gateway field that indicates the backup gateway.

17. The method of claim 15, wherein the active gateway comprises a first Virtual Tunnel Endpoint (VTEP) and the backup gateway comprises a second VTEP.

18. The method of claim 17, wherein the control message indicates an identifier for the logical network.

19. The method of claim 15, wherein the control message comprises a control packet having an Operations, Administration and Maintenance (OAM) bit set.

20. The method of claim 15, wherein the logical network comprises a nvo3 (Network Virtualization Overlays) type logical network.

* * * * *